United States Patent Office 3,580,970
Patented May 25, 1971

3,580,970
DEHYDROGENATION OF CYCLOALIPHATIC
KETONES AND ALCOHOLS
Harold E. Swift, Gibsonia, Pa., assignor to Gulf Research
& Development Company, Pittsburgh, Pa.
Continuation-in-part of application Ser. No. 506,479,
Nov. 5, 1965. This application Nov. 22, 1967, Ser.
No. 689,233
Int. Cl. C07c 39/00, 39/02, 39/12
U.S. Cl. 260—621H
9 Claims

ABSTRACT OF THE DISCLOSURE

Cycloaliphatic ketones and alcohols are dehydrogenated to the corresponding hydroxyaromatic compounds at elevated temperatures in the presence of a novel nickel-tin catalyst.

---

Figure 1:
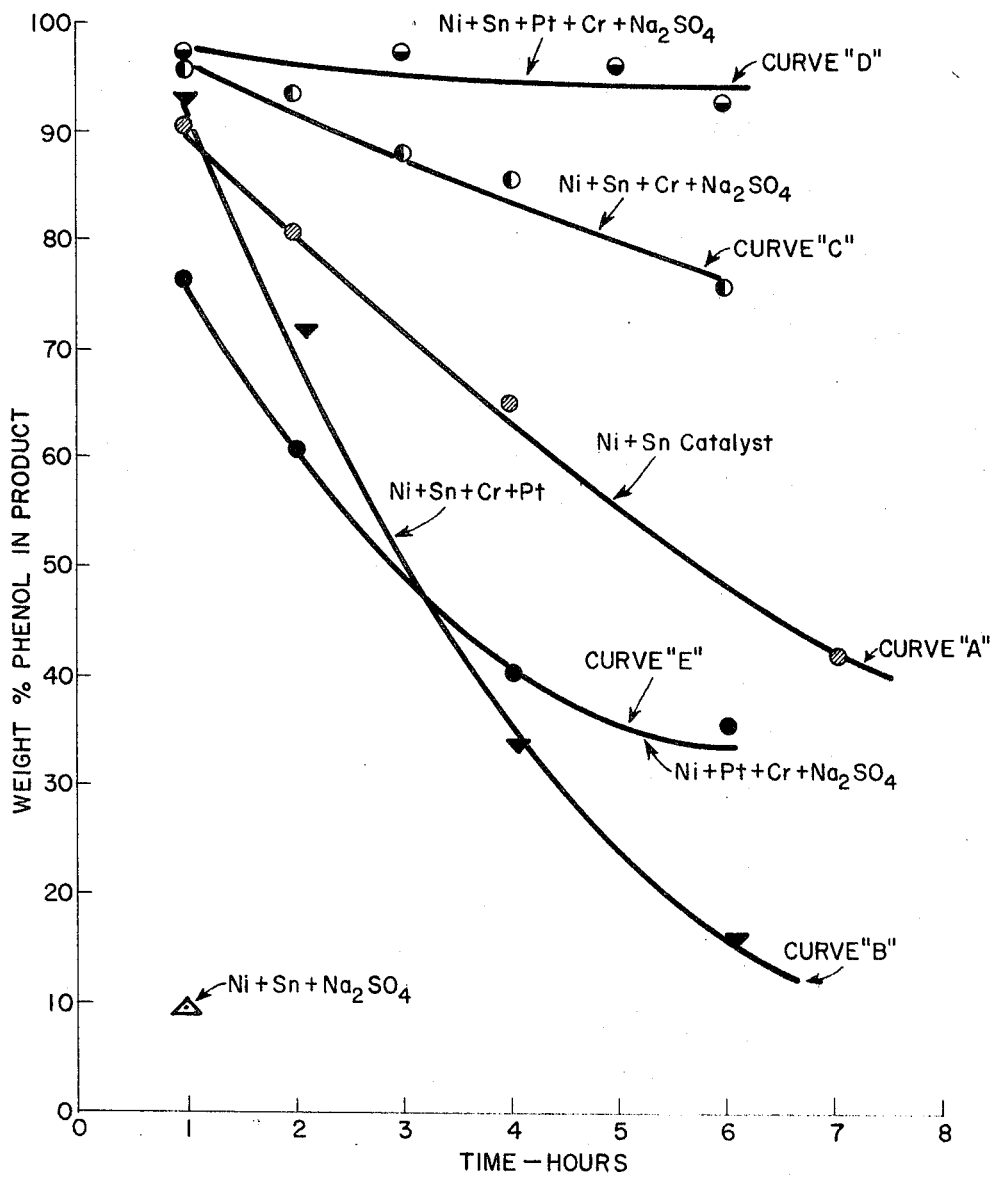

This application is a continuation-in-part of U.S. Ser. No. 506,479, filed Nov. 5, 1965, now abandoned.

This invention relates to novel dehydrogenation catalysts comprising a Group VIII metal and tin and to a process for the dehydrogenation of cycloaliphatic ketones and alcohols in the presence of a catalyst comprising a Group VIII metal and tin.

The dehydrogenation of certain cycloaliphatic ketones and alcohols, such as cyclohexanone and cyclohexanol, to produce phenol has been known for many years. It has now been found, in accordance with the invention, that valuable hydroxyaromatic compounds can be obtained from cycloaliphatic ketones and alcohols wherein the oxygen is directly connected to a cycloaliphatic ring carbon atom by a process which comprises contacting the cycloaliphatic compound under dehydrogenation conditions with a catalyst comprising a Group VIII metal and tin. It has additionally been found that the selectivity of the process for the production of the desired dehydrogenation product can be directed by the addition to the catalyst of certain selected metals.

Perhaps the most valuable dehydrogenation product from cyclohexanone and cyclohexanol is phenol. The primary problem associated with the production of phenol is obtaining a conversion of the cycloaliphatic compound at a level considerably in excess of 75 percent, while simultaneously achieving a high selectivity to the desired phenol product. Both high conversions and selectivities are required for a successful operation since otherwise the phenol cannot be easily separated by distillation from unreacted cyclohexanone with which it forms a maximum boiling azeotrope at 75 percent phenol. If other methods of separation are employed, then lower conversions can be tolerated. From a commercial standpoint, it is desirable to obtain conversions of the cycloaliphatic compound well in excess of 90 percent with selectivities to phenol also well in excess of 90 percent. Additionally, adequate catalyst life is a problem faced in any catalytic process involving hydrocarbon transformations, including the dehydrogenation of cycloaliphatic ketones and alcohols.

It has now been found that an excellent catalyst having very high efficiency for the conversion of cycloaliphatic ketones and alcohols to hydroxyaromatic compounds having the same number of rings per molecule can be obtained by incorporating critical proportions of a Group VIII metal and tin in the catalyst of this invention. Furthermore, the addition of certain combinations of materials to the Group VIII metal-tin catalyst has been found to stabilize the activity of the catalyst. Additionally, a novel catalyst is provided that retains its activity over extended periods of operation and in addition is easily regenerable to essentially its original activity.

In accordance with the invention, a cycloaliphatic ketone or alcohol or mixture thereof wherein the oxygen is directly connected to a ring carbon atom is converted to a hydroxyaromatic compound having the same number of rings as the cycloaliphatic compound by a process which comprises contacting the cycloaliphatic compound under dehydrogenation conditions with a catalyst comprising a Group VIII metal, preferably nickel, or mixtures thereof and tin wherein the molar ratio of the Group VIII metal to tin is at least 1.7:1.

In one embodiment of this invention the catalysts for use in the dehydrogenation process comprise a Group VIII metal and tin, wherein the molar ratio of the Group VIII metal to tin is at least 1.7:1, an alkali metal sulfate, and chromium, mostly in the form of its oxide.

In another embodiment of this invention, the catalysts for use in the dehydrogenation process comprise a Group VIII iron group metal and tin, wherein the molar ratio of the Group VIII iron group metal to tin is at least 1.7:1, an alkali metal sulfate, chromium, mostly in the form of its oxide, and a noble metal.

In yet another embodiment of this invention, the tin-Group VIII metal catalyst which is especially active for the dehydrogenation of cycloaliphatic ketones and alcohols is produced by a process which comprises heating a solid intimate admixture of a tin compound and at least one Group VIII metal compound wherein the molar ratio, calculated as the metal, of Group VIII metal to tin is at least 1.7 to a temperature between 250° and 600° C. for a time of at least five hours in the presence of a gas-containing free molecular oxygen resulting in a solid intimate mixture of the metal oxides. This oxide mixture is then reduced to the metals in hydrogen gas at an elevated temperature.

The charge stock can be any cycloaliphatic ketone or alcohol wherein the oxygen is directly connected to a ring carbon atom. By cycloaliphatic is meant a ring-type compound which is at least partially saturated, and may be mononuclear or polynuclear, that is containing from one to four rings, in which the ring to which the oxygen atom is attached is at least partially saturated. These cycloaliphatic ketones and alcohols include those compounds which contain from one to three oxygen atoms each of which is directly connected to a ring carbon atom. The preferred cycloaliphatic compounds are the mononuclear naphthenic type compounds of the general formula $CnH_2n$, where $n$ is the integer 5 or 6. The especially preferred charge stock is cyclohexanone, cyclohexanol, and mixtures of the two. The ring compounds can have one or more groups attached to the ring which do not interfere with the dehydrogenation reaction, such as lower alkyl having from one to four carbon atoms, phenyl, benzyl, tolyl, xylyl, etc. The charge stock compounds can suitably contain between 4 and 18 carbon atoms per molecule and preferably contain between 6 and 10 carbon atoms. Suitable charge stock compounds include the following without being limited, thereto, cyclohexanol,
cyclohexanone,
cyclohexenol,
cyclohexenone,
1,3-cyclohexanediol,
1,4-cyclohexanediol,
1,3-cyclohexanedione,
1,4-cyclohexanedione,
4-methylcyclohexanone,
4-t.butylcyclohexanol,
3,5-dimethylcyclohexanone,
4-phenylcyclohexanone,
3-tolylcyclohexanone,
cyclopentanol, cyclopentanone,
3-methylcyclopentanol,
2-ketotetralin,
2-(1-cyclohexenyl)cyclohexanone,
2,6-dicyclohexenylcyclohexanone, etc.

Inert diluents, such as aliphatic paraffins can be present in the charge stock, if desired, but their presence merely utilizes needed reactor space and reduces the space-time-yield of products. Unsaturated compounds, such as acetylenes, linear or branched olefins, and aromatic type compounds can be tolerated, but are undesirable as they may tend to polymerize, hydrogenate or adversely affect the equilibrium of the desired reaction.

As can be seen, the process of this invention involves the dehydrogenation of cycloaliphatic ketones and alcohols to obtain hydroxyaromatic compounds having the same number of rings and oxygen atoms as the starting material. For the sake of simplicity, the process will be described with specific reference to the conversion of cyclohexanone and cyclohexanol to phenol, but it is understood that the catalyst, reaction conditions, etc., will be esentially similar for the conversion of the other cycloaliphatic charge stocks described above.

It has now been found in accordance with the invention that phenol can be obtained by simply contacting cyclohexaone with a catalyst comprising a Group VIII metal and tin under dehydrogenation conditions.

These metals can be unsupported or supported and are present mostly in the metallic form. If a support is employed, any solid inert material can be used which has poor cracking characteristics. Such materials are well known in the art and include low surface area silica, high surface area silica, low and high surface area aluminas, silica-aluminas which are treated as by steaming to reduce their cracking activity, magnesia, etc., and combinations of these materials. The surface area of the supported catalyst can vary from about 0.1 square meters per gram (m.$^2$/g.) to about 500 m.$^2$/g. with a preferred surface area of about .2 m.$^2$/g. to about 275 m.$^2$/g. The unsupported catalyst can have a surface area from about 0.1 m.$^2$/g. to about 50 m.$^2$/g. and preferably from about 5 m.$^2$/g. to about 20 m.$^2$/g. The supported catalyst in the higher range of surface area is pyrophoric and for this reason adequate precaution must be exercised in its use.

As noted above, in this invention a cycloaliphatic ketone or alcohol is converted to a hydroxyaromatic compound by a process which comprises contacting the cycloaliphatic compound under dehydrogenation conditions with a catalyst comprising metallic tin and a Group VIII metal wherein the molar ratio of the Gorup VIII metal to tin is at least 1.7:1. Substantially all of the Group VIII metal and tin are present in the metallic form with a portion of the Group VIII metal and substantially all of the tin present in the form of a Group VIII metal-tin alloy and a significant portion of the Gorup VIII metal present as free metal, as determined by X-ray diffraction analysis and additionally in the case of nickel-tin catalysts by nickel extraction with carbon monoxide according to the Mond process. It has been determined that neither the Group VIII metal alone nor the Group VIII metal-tin alloy alone will function herein, rather it is essential that the catalyst contain a mixture of the Group VIII metal and the Group VIII metal-tin alloy in order to function in accordance with the disclosure herein. It has been found further that a catalyst comprising a Group VIII metal and tin, wherein the molar ratio of Group VIII metal to tin is less than 1.7:1, is substantially inactive for the production of the hydroxyaromatic compound. The preferred molar ratio of the Group VIII metal to tin is between 2:1 and 8:1 with the most preferred ratio being about 2.5 to 1. The molar ratio can be as high as 15:1, if desired.

By a Group VIII metal is meant iron, cobalt, nickel, ruthenium, rhodium, palladium, osmium, iridium, and platinum. The preferred Group VIII metal is nickel. It has also been found quite unexpectedly that a combination of nickel and platinum is better than nickel alone.

If a Group VIII metal is employed together with the tin on a support, then the amount of Group VIII metal can suitably be between 2 and 20 weight percent and is preferably between 8 and 14 weight percent. Smaller or larger amounts of the Group VIII metal can be employed, but to no specific advantage. If a support is employed, the amount of tin can vary between 2 and 30 weight percent, with preferred amounts between 5 and 15 weight percent.

The supported Group VIII metal-tin catalysts of this invention are adversely affected by the addition of certain agents, such as sodium sulfate and chromium when these agents are added individually. It has now been found quite surprisingly, that the catalysts of this invention are improved in actitvity, selectively, and especially in aging characteristics by the addition of a combination of an alkali metal sulfate and chromium. In addition, it has been found that the activity, selectivity, and aging characteristics of a nickel-tin catalyst are unexpectedly still further improved by the addition of platinum.

In addition, again quite surprisingly, it has been found that while the supported Group VIII-tin catalysts are adversely affected by the addition of a combination of chromium and platinum, the unsupported Group VIII-tin catalysts are promoted.

Figure 2:
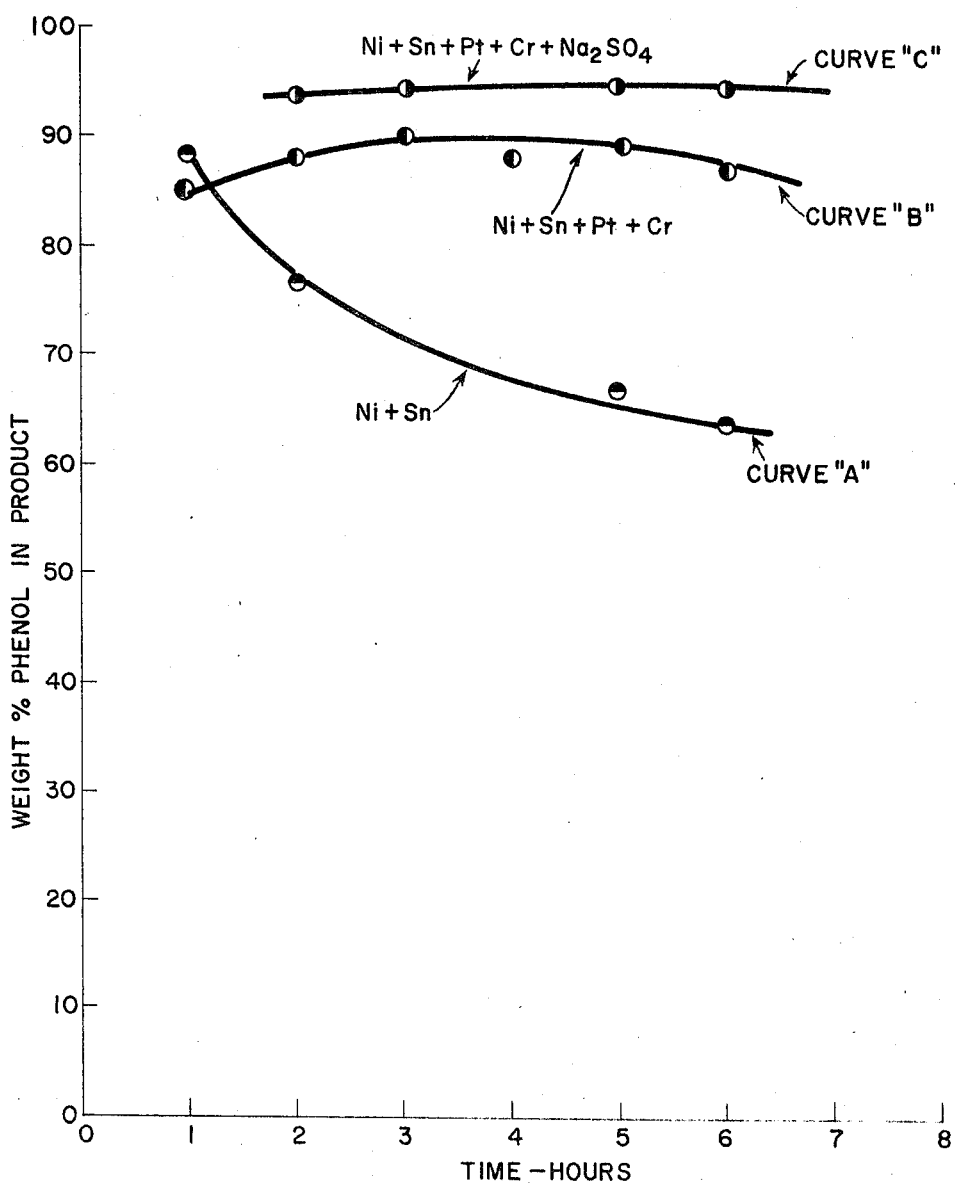

These results are summarized in FIGS. 1 and 2 attached, FIG. 1 referring to the supported catalyst data and FIG. 2 referring to the unsupported catalysts. The support used for the catalysts in FIG. 1 was a low surface area (less than 50 square meters per gram) silica obtained from Filtros Incorporated and designated by them as Filtros FS-140-L.

Referring to FIG. 1 attached:

Curve "A" shows that the activity of a supported nickel-tin (6:1 molar ratio of Ni:Sn) catalyst is initially very high (over 90 percent phenol from cyclohexanone the first hour) but diminishes rapidly, indicating poor aging characteristics;

The single point on FIG. 1 at one hour and 10 weight percent phenol in the product shows the effect of adding three parts of $Na_2SO_4$ to 100 parts of nickel on the curve "A" catalyst;

Curve "B" shows that the addition of 0.35 weight percent chromium and 0.18 weight percent platinum to the nickel-tin "A" curve catalyst has a deactivating effect and makes the catalyst age more rapidly.

Curve "C" shows that the addition of both sodium sulfate (three parts per 100 parts of nickel) and 0.34 weight percent chromium has an unexpected beneficial effect on the activity and life of the nickel-tin catalyst; and Curve "D" shows that the further addition of 0.18 weight percent platinum to the chromium-sodium sulfate promoted curve "C" catalyst further increases the activity and further improves the aging characteristics of the nickel-tin catalyst.

That tin is an essential constituent of the catalyst of this invention is shown by curve "E" of FIG. 1 where the addition of 0.18 weight percent platinum, 0.35 weight percent chromium and 0.23 weight percent sodium sulfate to a supported 8.3 weight percent nickel catalyst did not result in the high conversions and excellent catalyst life achieved with the catalysts of this invention.

Referring to FIG. 2 attached:

Curve "A" shows that the activity of an unsupported nickel-tin catalyst is initially very high (about 88 percent), but diminishes rapidly, indicating poor aging characteristics;

Curve "B" shows that the addition of 0.18 weight percent platinum and 0.35 weight percent chromium greatly improves the aging characteristics of the catalyst, and this is contrary to the findings with the supported catalyst as shown by curve "B" in FIG. 1; and Curve "C" shows that the further addition of sodium sulfate (three parts per 100 parts of nickel) further improves the activity and aging characteristics of the platinum-chromium promoted nickel-tin catalyst.

The alkali metal sulfate stabilizing and promoting agent used in the catalysts of this invention can be any of the alkali metal or alkaline earth metal sulfates, alone or in admixture. By an alkali or alkaline earth metal is meant sodium, potassium, rubidium, cesium, magnesium, calcium, barium, and strontium. The preferred alkali metal sulfates are sodium and potassium sulfates with sodium sulfate being the most preferred.

The weight ratio of alkali metal sulfate to Group VIII metal is usually between 0.3 and 10, with preferred weight ratios between 1.0 and 6.0. The most preferred weight ratios are between 2.5 and 6.0.

While it is not certain, it is believed that the alkali metal sulfate is present in the catalyst in the form of the sulfate, but a portion of the sulfate may be combined with the chromium and possibly with the platinum, and leaving a portion of the alkali metal in the form of its oxide.

The chromium stabilizing and promoting agent is probably present in the catalyst mostly in the form of its oxide, but, as noted, may be present at least in part in the form of chromium sulfate. The molar ratio of chromium (calculated as the metal) to Group VIII metal (calculated as the metal) can be between 0.1 and 6.0 with the preferred ratio between 0.5 and 4.0.

The platinum metal promoter and stabilizing agent is present probably mostly in the form of platinum metal, although some platinum oxide or sulfate may also be present. Any of the other noble metals of Group VIII can also suitably be used in place of platinum as a promoter stabilizing agent for the Group VIII iron group metal-tin catalysts of this invention. These noble metals include ruthenium, rhodium, palladium, osmium, iridium and platinum. The iron group metals include iron, cobalt and nickel. The amount of noble metal to employ as a promoter for the Group VIII iron group metal can vary between 0.05 and 20 parts by weight of noble metal per weight of Group VIII iron group metal, and is preferably between 0.5 and 6 parts by weight of noble metal with the most preferred amount being about 2 parts by weight of the noble metal per weight of iron group metal.

The process of this invention, as noted above, is very simple in that a charge stock comprising, for example, cyclohexanol, cyclohexanone, or mixtures of these two is contacted with a catalyst comprising a Group VIII metal and tin under dehydrogenation conditions and the conversion of the cyclohexanone and cyclohexanol to phenol is in excess of 90 percent for extended periods of operation. Phenol is recovered from the reaction product by distillation. As noted above, phenol forms a constant boiling mixture with cyclohexanone, and this mixture can be recycled to the reaction zone for further conversion of the cyclohexanone, if desired.

The dehydrogenation conditions include an operating temperature between about 200° and 500° C. with a preferred temperature depending to large extent on the particular charge stock employed. For the production of phenol from cyclohexanone and cyclohexanol, or mixtures of the same, the preferred reaction temperatures are between about 250° and about 500° C. with more preferred reaction temperatures between about 300° and about 450° C. At temperatures above the preferred limits, efficiency and catalyst life are lowered and conversion suffers at temperatures below the preferred limits, that is, equilibrium favors the production of cyclohexanone and cyclohexanol from phenol. The catalysts of this invention function as dehydrogenation catalysts if the reaction conditions are such that from equilibrium considerations the unsaturated products are favored. That is, the conversion of cyclohexanol and cyclohexanone to phenol is favored at the higher temperatures and lower hydrogen pressures. The reaction pressure is therefore preferably atmospheric, or below, however, higher pressures can be used, for example, up to 50 p.s.i.g. or higher.

The liquid hourly space velocity or contact time is correlated with the reaction temperature, type of charge stock, and the specific catalyst employed. The liquid hourly space velocity is preferably low enough (contact time long enough) at any specific temperature to result in a concentration of phenol (or other desired hydroxyaromatic) in the product sufficiently high that it can easily be separated from the cyclohexanone (or other charge stock components) by distillation. Suitable liquid hourly space velocities are between about 0.05 and about 5, preferably between about 0.1 and about 2 vol./vol./hr., with the higher space velocities being useful with the more active catalysts and higher temperature of operation.

The reaction described herein is either a gas phase reaction or a liquid phase reaction depending upon the boiling point of the reactant, the reaction temperature, and the reaction pressure. In either case the reactant gas or liquid is preferbly flowed through the reactor either downflow or upflow in contact with the catalyst. Because of the low pressures, preferably atmospheric, and high temperatures employed, the cyclohexanone charge stock is in the vapor phase and is passed through the catalyst bed using hydrogen as the carrier gas. Although the use of hydrogen as a carrier gas is not critical, and the process can be run without it, the catalyst life is shortened if added hydrogen is not present in the gas stream. The molar ratio of hydrogen to the charge stock is suitably between about 1 and 15, and preferably between about 4 and 8 moles of hydrogen per mole of the cycloaliphatic feed material.

In another aspect of the subject invention, the method of preparing the tin-Group VIII metal catalyst has been found to be important for obtaining a catalyst having the best activity and aging characteristics for use in the process of this invention. In accordance with the invention, a tin-Group VIII metal catalyst which is especially active for the dehydrogenation of cycloaliphatic ketones and alcohols is produced by a process which comprises heating a solid intimate admixture of tin and Group VIII metal oxides to a temperature between about 250°, preferably about 300°, and 600° C. for a time of at least five hours in the presence of a gas containing free molecular oxygen followed by reduction to the metals in hydrogen at an elevated temperature.

The solid intimate admixture of a Group VIII metal and tin oxides can be an unsupported admixture obtained by any suitable procedure or an admixture of supported Group VIII metal and tin oxides prepared by any suitable procedure. For example, a Group VIII metal and tin hydroxide can be coprecipitated from an aqueous solution of nickel nitrate and tin chloride by the addition of sodium hydroxide or ammonium hydroxide, and the metal hydroxides converted to the metal oxides by heating.

If a supported catalyst is desired, one suitable procedure is to impregnate a support from an aqueous solution of a Group VIII metal and tin salts, such as nickel nitrate and tin chloride, and thereafter heating the catalyst for a time and at a temperature sufficient to decompose the metal salts to the desired oxides. Temperatures of about 500° C. and times of about three hours are usually employed to convert the metal salts to the oxide form.

Another suitable procedure is to add a dilute aqueous solution of sodium hydroxide to a Group VIII metal salt, e.g. $Ni(NO_3)_2 \cdot 6H_2O$ and a tin salt, e.g. $SnCl_2 \cdot 2H_2O$ to form a colloidal precipitate and then to impregnate a support, dry it and calcine it as above.

Still another suitable procedure is to admix a finely divided support with an intimate admixture of a Group VIII metal oxide, e.g. nickel oxide and tin oxide, heat the admixture in the presence of water, say at 90° C. for six hours, to prepare a paste which can then be dried, calcined and pressed into pellets. Both the supported and the unsupported catalysts can be formed into pellets, extrudates, etc., either preceding or following the reduction step.

Figure 3:
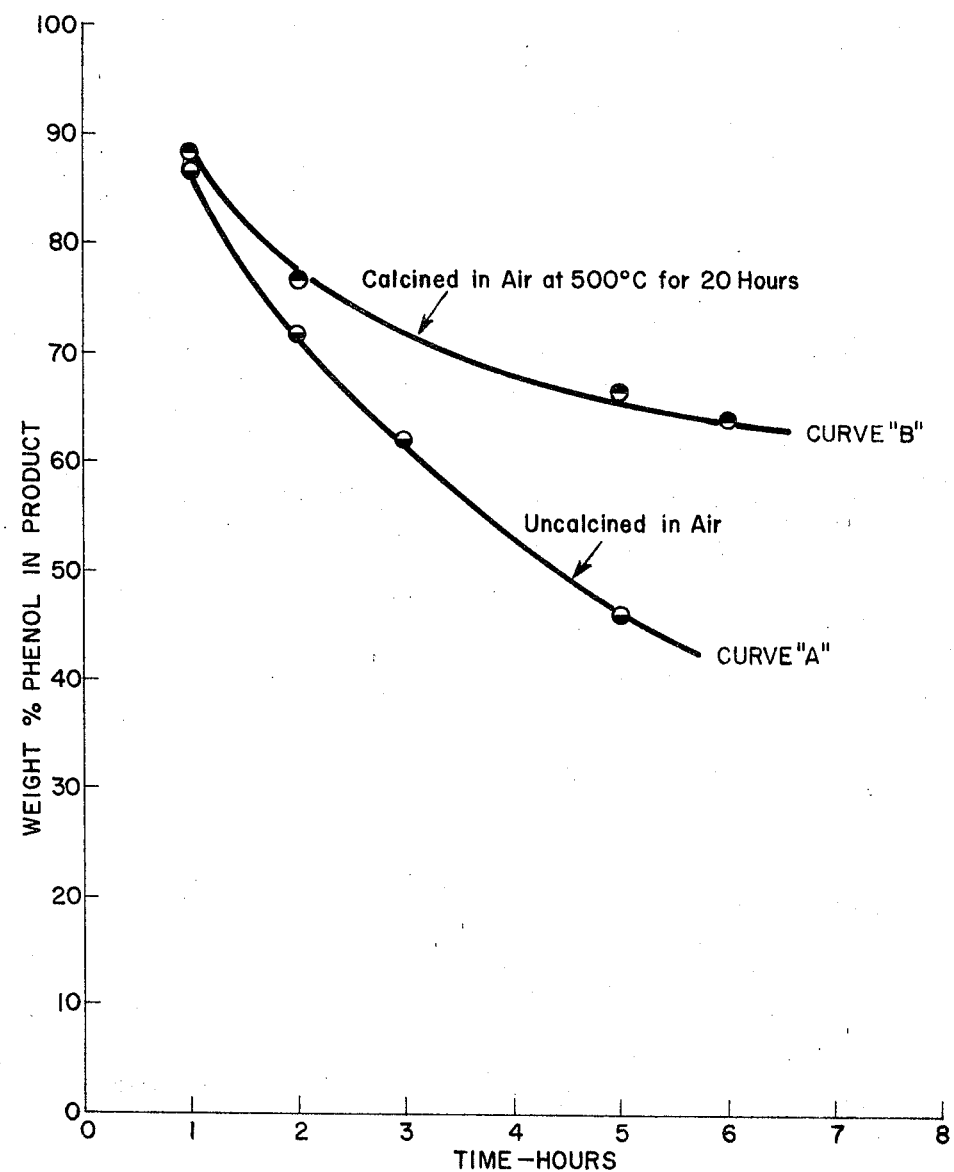

The catalysts comprising an intimate admixture of at least one Group VIII metal oxide, e.g. nickel oxide, and tin oxide, are next oxidized in the presence of a gas containing free molecular oxygen for a time greater than five hours and at a temperature in excess of 250° C. so that the resulting admixture of oxides on reduction with hydrogen results in a mixture of metals having increased activity for the production of phenol from cyclohexanone. That is, it has been found that the temperature of oxidation and the length of time of oxidation are important for obtaining Group VIII metal-tin catalysts which are the most active in the process of this invention. Group VIII metal-tin catalysts heated in air at 500° C. for three hours and then reduced in hydrogen have been found to be much less active than the same catalysts heated in air at 500° C. for twenty hours and then reduced in hydrogen. FIG. 3 attached shows data for an unsupported nickel-tin catalyst heated in air for different periods of time. Referring to FIG. 3, curve "A" represents the data for an unsupported nickel-tin catalyst heat treated in air at 110° C. for twenty hours. Curve "B" on FIG. 3 represents the data for the same unsupported nickel-tin catalyst heat treated in air at 500° C. for twenty hours. The added heat treatment (calcining) at 500° C. rather than 110° C. in the presence of air resulted in a catalyst after reduction having unexpectedly superior activity and aging characteristics. The gas containing free molecular oxygen can suitably have between 5 and 100 weight percent oxygen. Air, because of availability, is the preferred gas.

The catalysts after heat treating in the presence of air are preferably reduced with hydrogen to transform substantially all of the Group VIII metal and tin and also platinum, if present, to the metallic state. Suitable reduction conditions include passing hydrogen over the catalyst at temperatures of about 375° C. for about three hours. Since the reduction is a time-temperature function, these two variables must be correlated to obtain substantially complete reduction of the metals. The temperature must be at least about 250° C. and preferably about 300° C. and should be no higher than about 800° C., preferably 550° C. The catalyst can be added to the reaction zone and be reduced in a hydrogen stream prior to addition of the reactant gas or it can be reduced at the conditions of reaction, for the reaction conditions include an elevated temperature and the presence of hydrogen which is normally added as a carrier gas. It is preferred to reduce the catalyst prior to its contact with the reactant charge stream.

It is observed that the extended oxidation treatment followed by the reduction step results in a catalyst which is more active in promting the subject reaction. In any event, it can be seen from the above results that the most active nickel-tin catalysts are those where the intimate admixture of nickel and tin oxides are heated in the presence of a gas containing free molecular oxygen for a period of at least five hours, preferably 10 to 30 hours, at a temperature of at least 250° C., preferably between 350° and 500° C., but the temperature should not exceed about 600° C. Longer heating times can be used, say to 50 or 100 hours, but to no added purpose.

It has also been found that the type of Group VIII metal salt employed in the preparation of impregnated catalysts is important for obtaining the most active catalysts. It is preferred to avoid the use of Group VIII metal halide salts, if possible, in the preparation of the supported catalysts of this invention, especially catalysts having the higher molar ratios of Group VIII metal to tin.

The Iron Group (Fe, Co and Ni) metal nitrates and iron group organo metallics, such as acetates, carbonates and benzoates, are preferred. It is difficult to obtain soluble salts of palladium, osmium, iridium and platinum other than the halides, but non-halide salts, such as diamminepalladium (II) hydroxide [$Pd(NH_3)_2(OH)_2$] are preferred, if available.

The preferred salts for preparing supported catalysts by impregnation include, but are not limited to, ferrous acetate, ferric nitrate, cobaltous acetate, cobaltous benzoate, cobaltous nitrate, nickel acetate, nickel nitrate, ruthenium acetate, ruthenium carbonate, ruthenium acid carbonate, ruthenium nitrate, rhodium nitrate, and diamminepalladium (II) hydroxide. Other salts, such as for example, $PdCl_2$; $PdCl_2.2H_2O$; $OsCl_2$; $OsCl_4$; $OsCl_3.3H_2O$; $PtCl_4$; $PtCl_4.5H_2O$; $IrBr_3.4H_2O$; and $IrCl_2$ can also be used, and they may be the only soluble salts of the desired metal available for impregnation of a support.

In addition, it has been found that hydrogen sulfide has a very detrimental effect on the process of this invention, and it is therefore preferred to avoid the use of metal salts containing sulfur to prepare the catalysts of this invention. Likewise, the charge stock should be relatively free of sulfur and sulfur containing materials.

Any tin salt can be used to prepare the supported catalysts. It is preferred to use those tin salts which can be conveniently dissolved or dispersed in an organic or inorganic solvent, e.g. dimethylformamide or water. Suitable tin salts include, but are not limited to, the tin halides, such as stannic chloride, stannic bromide, stannous chloride and organo tin salts, such as stannous acetate, stannous oxalate, dicyclopentadienyl tin (II) and dibenzyldiethylstannane.

The catalyst does eventually lose activity during operation, however, the activity can be restored substantially completely by oxidative regeneration followed by reduction in hydrogen. Catalysts have been regenerated by heating in the presence of air at 400° C. while controlling the temperature by dilution with nitrogen. Temperatures as low as 300° C. can suitably be employed. The temperature during the oxidative regeneration step should not exceed 600° C. the time and temperature of regeneration should be such that the catalyst on reduction regains substantially all of its original activity. The reduction step is conducted in hydrogen at the same conditions as utilized for preparing the original catalyst.

The invention will be further described with reference to the following experimental work.

A series of supported catalysts were prepared using varying amounts of nickel and tin as shown in Table I below:

TABLE I

| | Weight percent Ni | Weight percent Sn | Ni/Sn molar ratio | BET [1] surface area, m.$^2$/gm |
|---|---|---|---|---|
| Catalyst Number: | | | | |
| 1 | 12 | 0 | ∞ | 246.7 |
| 2 | 8.3 | 3.7 | 4.5 | 237.4 |
| 3 | 8.7 | 7.1 | 2.5 | 242.7 |
| 4 | 6.6 | 14.2 | 0.9 | 209.7 |

[1] Using a nitrogen adsorbent.

The support used for all of the catalysts in Table I was a high surface area silica sold by the Davison Chemical Company under the trade name Davison Grade 70 and found to have a BET surface area using a nitrogen adsorbent of 261.4 square meters per gram. The catalysts were prepared by impregnating the silica support with an aqueous solution of proper concentration of nickel nitrate and tin chloride ($SnCl_2 \cdot 2H_2O$) to the point of incipient wetness. The catalysts were dried at 110° C. for twenty hours; thereafter calcined in air at 500° C. for twenty hours; and finally reduced in hydrogen at 375° C. for three hours.

Each of these catalysts, 1 through 4, was subjected to carbon monoxide in accordance with the Mond process to remove nonalloyed metallic nickel from the catalyst. Dried carbon monoxide was passed over a sample of each reduced catalyst for six hours at 80° C. and a gas hourly space velocity of approximately 300. The volatile nickel carbonyl which was formed was swept out of the sample tube and decomposed to nickel and carbon monoxide at 300° C. in another tube. The amount of nickel removed from each catalyst is set forth in Table II.

TABLE II

| Catalyst Number: | Nickel, percent | Tin, percent | Nickel removed, percent |
|---|---|---|---|
| 1 | 12 | 0 | 95-100 |
| 2 | 8.3 | 3.7 | 29 |
| 3 | 8.7 | 7.1 | 15 |
| 4 | 6.6 | 14.2 | 0 |

This provides an indication of the amount of free metallic nickel present in each catalyst and the amount of nickel alloyed with tin.

Catalysts 1 through 4 were used in Examples 1 through 4 below to test their activity for the conversion of cyclohexanone to phenol after one hour of operation. The runs for Examples 1 through 4 were made at 375° C., atmospheric pressure, and using a liquid hourly space velocity of cyclohexanone of 1.4 vol./vol./hr. Hhydrogen was used as the carrier gas. The results are summarized in Table III below.

TABLE III

| Example Number: | Ni/Sn | Percent conversion of cyclohexanone | Percent selectivity to phenol |
|---|---|---|---|
| 1 | ∞ | 33.6 | 81.5 |
| 2 | 4.5 | 97.9 | 96.1 |
| 3 | 2.5 | 98.5 | 98.0 |
| 4 | 0.9 | 16.0 | 6.0 |

Referring to Table III, Example 1 using the supported nickel catalyst with no tin gave a conversion and selectivity completely unacceptable as the phenol could not successfully be separated from the unconverted cyclohexanone. In like manner, catalyst 4 wherein the molar ratio of nickel to tin was 0.9:1 gave very little conversion and practically no selectivity to the production of phenol. This result was very surprising since catalysts 2 and 3 wherein the molar ratio of nickel to tin was 4.5 and 2.5 respectively, gave practically quantitative conversion of cyclohexanone with almost 100 percent selectivity to the production of phenol. The data in Table III above show that the use of nickel alone (Example 1) results in a very poor dehydrogenation catalyst for cyclohexanone and they show that tin is an essential constituent of the catalyst in the proper proportion for use in the process of this invention (Examples 2 and 3).

The runs for Examples 1 through 4 were continued for as long as seven hours with the products being monitored to determine conversion and efficiency. The yield of phenol was determined by multiplying conversion by efficiency and these results are shown on FIG. 4.

Figure 4:
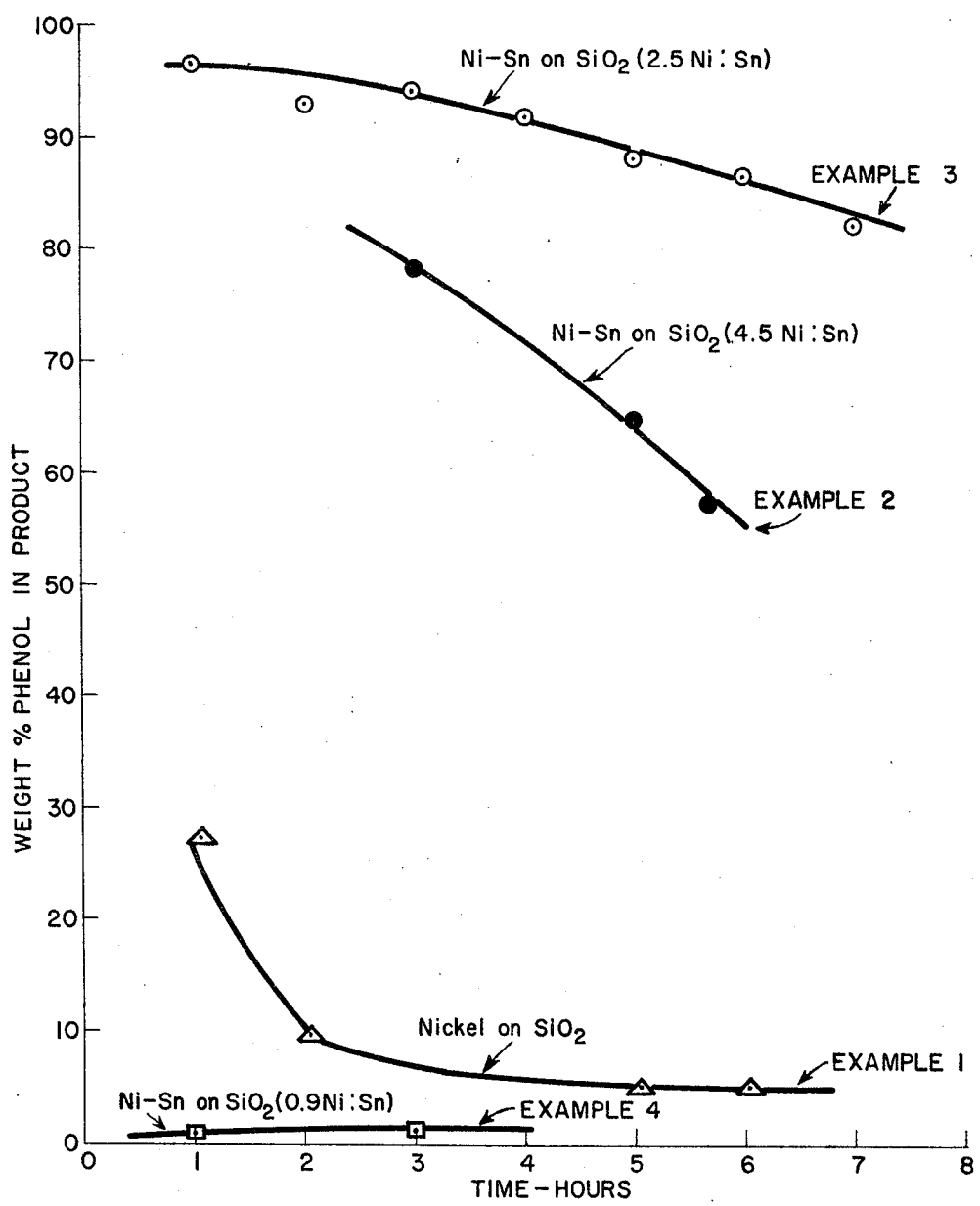

Referring to FIG. 4, the curve for Example 1 shows the yield of phenol drops off very rapidly for the nickel catalyst. The use of a nickel-tin catalyst wherein the nickel-tin molar ratio was 0.9:1 (Example 4) gives negligible yields of phenol while the higher nickel-tin ratio catalyst (Example 2) also results in a rapid drop off of yield. The nickel-tin catalyst wherein the molar ratio of nickel to tin is 2.5 (Example 3) maintains the yield of phenol at a fairly high level indicating that the optimum nickel to tin ratio is about 2.5:1.

A second series of catalysts, 5 through 11, were prepared using a low surface area (0.2 m.²/gm.) silica sold under the trade name Filtros FS-140-L by Filtros Incorporated. The silica was impregnated with an aqueous solution of nickel nitrate, Ni(NO₃)₂·6H₂O, and stannous chloride, SnCl₂·2H₂O, to the point of incipient wetness. The catalyst was then dried at 110-120° C. for three hours and then calcined in air at 500° C. for either three or twenty hours. The catalysts were then reduced with hydrogen at 375° C. for three hours.

Sodium was added to the impregnating solutions used to prepare some of the catalysts (7 through 9). The sodium was added in the form of either a dilute aqueous solution of sodium hydroxide or sodium sulfate. When the dilute aqueous solution of sodium hydroxide was added to the aqueous solution of nickel nitrate and tin chloride, a light green precipitate formed which was colloidal in nature and remained suspended in solution. The silica was then impregnated with the suspended precipitate, dried, calcined in air, and reduced as described above.

The catalysts were finally tested for their activity in Examples 5 through 11 for the conversion of cyclohexanone to phenol after one hour of operation by the same procedure and under the same conditions as in Examples 1 through 4 above.

The results are shown in Table IV below.

TABLE IV

| Example and catalyst No. | Weight percent Ni | Weight percent Sn | Ni/Sn molar ratio | Treated with— | Calcined in air, hours | Weight percent conversion | Percent selectivity to phenol |
|---|---|---|---|---|---|---|---|
| 5 | 8.15 | 2.24 | 6.0 | | 3 | 79.8 | 96.9 |
| 6 | 8.15 | 2.24 | 6.0 | | 20 | 92.8 | 96.3 |
| 7 | 8.15 | 2.24 | 6.0 | NaOH | 3 | 78.0 | 96.4 |
| 8 | 8.15 | 2.24 | 6.0 | NaOH | 20 | 91.0 | 95.2 |
| 9 | 8.15 | 2.24 | 6.0 | Na₂SO₄ | 20 | 11.9 | 86.4 |
| 10 | 9.00 | 2.22 | 8.0 | | 20 | 77.5 | 97.9 |
| 11 | 8.13 | 6.80 | 1.8 | | 20 | 10.7 | 76.7 |

Referring to Table IV, a comparison of Examples 5 and 6 shows the importance of calcining in air for an extended period of time, calcining for three hours giving only 79.8 percent conversion while a catalyst calcined for twenty hours results in a conversion of 92.8 weight percent.

That the addition of sodium hydroxide to the impregnated solution has no detrimental effect is shown by a comparison of Examples 7 and 8 with Examples 5 and 6 respectively, where substantially the same results were obtained for like calcined-in-air catalysts.

The addition of three weight percent sodium sulfate based on the nickel is detrimental, as shown by a comparison of Examples 6 and 9 where conversion dropped drastically from 92.8 to 11.9 percent merely by adding the sodium sulfate.

A comparison of Examples 6, 10 and 11 shows the effect of varying the nickel to tin molor ratio on the activity of the catalyst. A molar ratio of six (Example 6) gives excellent results while a ratio of eight (Example 10) reduced conversion to 77.5 percent and a ratio of 1.8 results in a reduction in conversion to 10.7 percent while maintaining a reasonable selectivity to phenol production.

A comparison of Examples 4 and 11 shows that when the Ni:Sn ratio is reduced from 1.8:1 (Example 11) to 0.9:1 (Example 4) the selectivity to phenol production drops from 76.7 percent to 6 percent, thus showing that the molar ratio of nickel (Group VIII metal) to tin should be at least 1.7:1, and is preferably at least 2:1 for good conversion and selectivity to the production of phenol.

Example 6 was repeated except the run was continued for seven hours. The results are shown on curve "A" of FIG. 1 and, as discussed above, the aging characteristics of this catalyst were not as good as desired.

Figure 5:
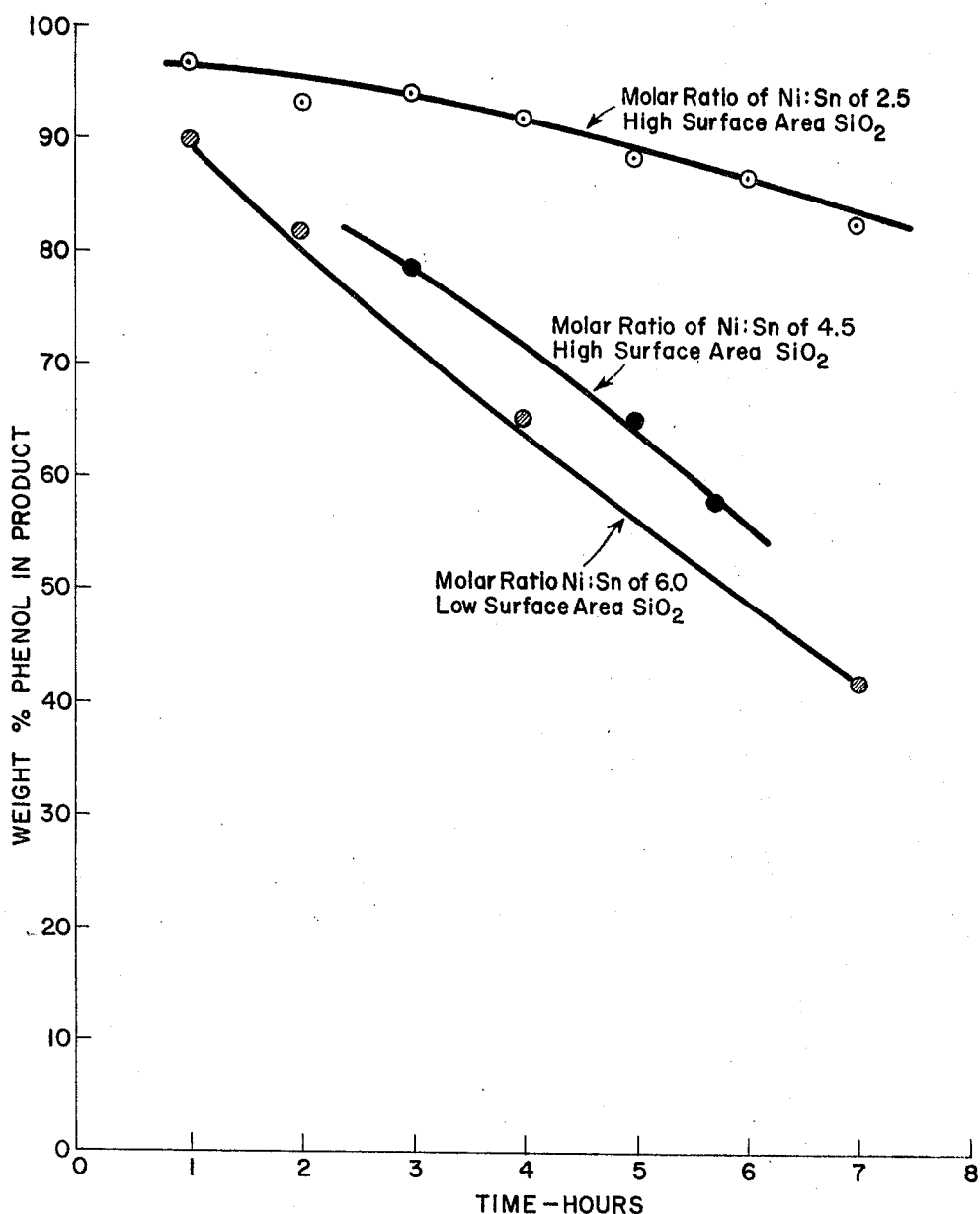

These results are in substantial agreement with the results shown in FIG. 4 where the nickel to tin catalyst having the higher nickel to tin ratio (4.5:1—Example 2 curve) showed much poorer aging characteristics than the 2.5 molar nickel to tin catalyst (Example 3 curve). If the Examples 2 and 3 curves of FIG. 4 and curve "A" of FIG. 1 are plotted together as is done on FIG. 5, it can readily be seen that as the nickel to tin ratio increases, the aging characteristics deteriorate. This further demonstrates that the optimum nickel to tin molar ratio is about 2.5:1.

It has also been found—as shown on FIG. 1 discussed above—that the addition of certain combinations of stabilizing agents, exemplified by chromium and sodium sulfate, serves to increase the activity and improve the aging characteristics of the supported nickel-tin catalyst. The addition of either chromium or sodium sulfate alone is detrimental while quite unexpectedly, the addition of both is beneficial. The addition of platinum to the chromium-sodium sulfate promoted catalysts confers still further benefits on the catalyst as shown by curve "D" on FIG. 1. All of the catalysts shown on FIG. 1 were prepared by the procedure used to prepare catalyst 6 above. The chromium and platinum promoters were added to the impregnating solution in the forms of chromium nitrate, $Cr(NO_3)_3 \cdot 9H_2O$ and 10 percent chloroplatinic acid respectively, but other soluble salts of chromium and platinum can be used or other methods of addition, such as separate addition of chromium and platinum, can be employed, if desired.

EXAMPLE 12

To further illustrate the invention, cyclohexanone was passed downflow in the vapor phase at atmospheric pressure and at 375° C. in a stream of hydrogen (hydrogen to cyclohexanone mole ratio of 6.2) through a bed of a nickel-tin promoted catalyst at a liquid hourly space velocity of 0.2 based on the cyclohexanone. The catalyst was prepared in accordance with the procedure of Example 6 above; and used the same low surface area silica support. The chromium and platinum promoters were added to the impregnating solution in the form of chromium nitrate $(Cr(NO_3)_2 \cdot 9H_2O)$ and a 10 percent chloroplatinic acid solution. Sufficient amounts of the chromium salt and platinum solution plus $Na_2SO_4$ were added to the aqueous solution of nickel nitrate $(Ni(NO_3)_2 \cdot 6H_2O)$ and $SnCl_2 \cdot 2H_2O$ so that the final catalyst had 2.6 weight percent tin; 8.1 weight percent nickel; 0.34 weight percent chromium; 0.18 weight percent platinum and 0.22 weight percent sodium sulfate. The nickel-tin molar ratio was six. The run was continued for 224 hours, during which time the conversion of cyclohexanone was 98–99 mole percent with an efficiency to the production of phenol of 98–99.5 mole percent.

The run was extended to 336 hours, at which time the conversion had decreased to 88.4 mole percent, but the average conversion over the entire 336-hour run was 96.8 mole percent with an average efficiency of 98.86 percent. The total throughput was 77.89 vol./vol. of catalyst or 13.84 bbl./ft.³. The weight balance over the run was 97.8 weight percent. The catalyst was regenerated by controlled burning as described above. The conversion and efficiency after 160 hours using the regenerated catalyst was 97.45 mole percent and 98.82 mole percent respectively.

EXAMPLE 13

To further illustrate the superior performance of a nickel-tin catalyst the following experiment was carired out. 70 grams of 10–20 mesh Davison Grade 70 silica gel was impregnated to the point of incipient wetness with a solution containing 29.6 grams of $Ni(NO_3)_2 \cdot 6H_2O$, 9.1 grams of $SnCl_2 \cdot 2H_2O$, 0.7 gram of $Cr(NO_3)_3 \cdot 9H_2O$, 3.5 cc. of 10 percent chloroplatinic acid, and 0.175 gram of $Na_2SO_4$. After drying at 110° C. for 20 hours and calcining in air at 500° C. for 20 hours, the catalyst was reimpregnated with a solution of 0.175 gram of $Na_2SO_4$ in 70 cc. of water and calcined an additional 2 hours at 500° C. The catalyst had a surface area of 240 m.²/g.

68 ml. of this catalyst were placed in an externally heated stainless steel reactor having an internal diameter of ¾ inch and 30 inches long. Hydrogen gas was flowed through the catalyst at a GHSV of 300 and temperature of 375° C. for 3 hours. Table 5 gives the data obtained from an X-ray diffraction analysis of this reduced catalyst. This demonstrates the existence of a nickel phase and a separate nickel-tin alloy phase. The temperature of the catalyst was held at 375° C. and a stream of vaporized cyclohexanone was introduced into the hydrogen stream to form a 6 to 1 molar ratio of hydrogen to cyclohexanone and this mixed stream passed (downflow) through the catalyst bed at a cyclohexanone liquid hourly space velocity of 0.2. The initial conversion of the cyclohexanone was 97 percent with a selectivity of 97 percent to phenol and a yield to phenol of 94 percent. The unit was run continuously at these conditions with the conversion and yield remaining constant after 2,010 hours of continuous operation. After an additional 30 hours of running, the conversion dropped to 95 percent while the selectivity remained constant at 97 percent.

At this point the catalyst was regenerated to its original activity by heating in air at 375° C. for 2 hours and by reducing in hydrogen at 375° C. for 3 hours. The reaction was repeated at the same conditions used in the first cycle resulting in 97 percent conversion and selectivity with an overall yield of 94 percent phenol.

TABLE V.—X-RAY DIFFRACTION LINES OF THE REDUCED NICKEL-TIN SILICA CATALYST

| Observed | | Nickel-tin alloy[a] | | Nickel metal[b] | |
|---|---|---|---|---|---|
| d(A.) | I | d(A.) | I | d(A.) | I |
| 2.92 | M | 2.92 | 80 | | |
| 2.59 | W | 2.61 | 10 | | |
| 2.29 | VW | | | | |
| 2.16 | W | | | | |
| 2.10 | M | 2.09 | 100 | | |
| 2.03 | M | 2.03 | 100 | 2.034 | 100 |
| 1.866 | VW | | | | |
| 1.765 | W | | | 1.762 | 42 |
| 1.672 | VW | 1.67 | 50 | | |
| 1.610 | VW | 1.60 | 50 | | |
| 1.552 | VW | 1.55 | 50 | | |
| 1.467 | W | 1.46 | 60 | | |
| 1.281 | VW | 1.29 | 50 | | |
| 1.246 | W | | | 1.246 | 21 |
| 1.191 | VW | 1.19 | 70 | | |
| 1.167 | VW | 1.18 | 40 | | |
| 1.098 | VW | 1.09 | 80 | | |
| 1.064 | W | | | 1.062 | 20 |

[a] ASTM card (3–1004).
[b] ASTM card (4–0850).
NOTE: I=Intensity; M=Medium; W=Weak; VW=Very weak.

EXAMPLE 14

The precipitates formed by adding ammonium hydroxide to a water solution of nickel nitrate and by adding stannous chloride to water were thoroughly mixed, dried at 110° C. for 16 hours, calcined in air at 500° C. for 20 hours, and reduced in hydrogen at 375° C. for 3 hours. The resulting unsupported nickel-tin catalyst had a surface area of 6 m.²/g. and a nickel to tin molar ratio of 3 to 1.

Two grams of this catalyst were mixed with quartz chips to from a catalyst bed volume in the reactor of 12 cc. A bed temperature of 375° C. was maintained as a 50:50 volume mixture of 2-(1-cyclohexenyl)cyclohexanone and benzene was passed over the catalyst at a liquid flow of 0.5 cc./min. using hydrogen as a carrier in a molar ratio of about 3 moles of hydrogen per mole of 2-(1-cyclohexenyl)cyclohexanone. The conversion by analysis was about 50 percent with a selectivity of 90 percent to o-phenylphenol.

In like manner cyclohexenol and cyclohexenone are dehydrogenated to phenol; 1,3-cyclohexanedione and 1,3-cyclohexanediol are converted to resorcinol; 1,4-cyclohexanedione and 1,4-cyclohexanediol are converted to hydroquinone; 4-methylcyclohexanone is converted to p-cresol; 4-t.butycyclohexanol is converted to 4-t.butylphenol; 3,5-dimethylcyclohexanone is dehydrogenated to 3,5-dimethylphenol; and 4-phenylcyclohexanone is converted to 4-phenylphenol. Also, in like manner 3-tolylcyclohexanone is converted to 3-tolylphenol; cyclopentanol and cyclopentanone are dehydrogenated to cyclopentanol; 3-methylcyclopentanol is converted to 3-methylcyclopentadienol; 2-ketotetralin is converted to α-naphthol; 2,6-dicyclohexenylcyclohexanone is converted to 2,6-diphenylphenol, etc.

The above data illustrate the catalysts of this invention have an exceptionally high activity, have extremely long life and are easily regenerable to their original activity.

Resort may be had to such variations and modifications as fall within the spirit of the invention and the scope of the appended claims.

I claim:

1. A process which comprises contacting a cycloaliphatic compound having 4 to 18 carbon atoms and containing as the only substitutent groups 1 to 3 keto oxygen atoms or hydroxyl groups directly attached to the ring carbon atoms, under dehydrogenation conditions with a catalyst having a surface area of at least 0.1 square meter per gram which comprises a Group VIII metal and in in a molar ratio of from about 1.7 to about 15 moles of Group VIII metal per mole of tin in which a portion of the Group VIII metal is present as free metal and the remainder of said Group VIII metal is present in a Group VIII metal-tin alloy and substantially all of said tin is present in said Group VIII metal-tin alloy.

2. A process in accordance with claim 1 in which from about 2 to about 8 moles of Group VIII metal are present in the catalyst for every mole of tin.

3. A process in accordance with claim 1 in which the catalyst comprises from about 2 to 20 weight percent Group VIII metal and from about 2 to 30 percent tin on an inert support.

4. A process in accordance with claim 1 in which the catalyst contains from about 0.1 to about 6.0 moles of chromium oxide calculated as the metal per mole of Group VIII metal and from about 0.3 to about 10 parts by weight of an alkali metal sulfate per part by weight of the Group VIII metal.

5. A process in accordance with claim 4 in which the Group VIII metal is nickel and which contains from about 0.05 to about 20 parts by weight of a noble metal per part by weight nickel.

6. A process in accordance with claim 3 in which said cycloaliphatic compound is selected from cyclohexanone, cyclohexanol and mixtures thereof.

7. A process in accordance with claim 6 in which the Group VIII metal is nickel and which contains from about 2 to about 8 moles of nickel per mole of tin, from about 0.5 to about 4 moles of chromium oxide calculated as the metal per mole of nickel, from about 0.5 to about 6 parts by weight platinum per part by weight nickel, and from about 1 to about 6 parts by weight sodium sulfate per part by weight nickel.

8. A process for making phenol which comprises contacting cyclohexanone, cyclohexanol or mixtures thereof under dehydrogenation conditions with a catalyst comprising nickel and tin in a molar ratio of from about 2 to about 8 moles of nickel per mole of tin and obtained by heating an intimate mixture of a reducible nickel compound and a reducible tin compound in an oxygen containing atmosphere at a temperature from about 250° C. to about 600° C. for at least five hours, and thereafter reducing said nickel compound and said tin compound to metallic nickel and metallic tin in a hydrogen atmosphere at an elevated temperature.

9. A process in accordance with claim 8 in which said metals are on an inert silica support and in which the catalyst contains from 0.1 to about 6.0 moles of chromium oxide calculated as the metal per mole of nickel, from about 0.3 to about 10 parts by weight of an alkali metal sulfate per part by weight of nickel, and from about 0.05 to about 20 parts by weight of platinum per part by weight nickel.

References Cited
UNITED STATES PATENTS 2,503,641    4/1950    Taylor et al. _____ 260—621X LEON ZITVER, Primary Examiner N. P. MORGENSTERN, Assistant Examiner U.S. Cl. X.R.

252—459, 466R, 472; 260—619R, 620, 617R, 624R

PO-1050
(5/69)

UNITED STATES PATENT OFFICE
CERTIFICATE OF CORRECTION

Patent No. 3,580,970                            Dated   May 25, 1971

Inventor(s)   Harold E. Swift

It is certified that error appears in the above-identified patent and that said Letters Patent are hereby corrected as shown below:

Column 3, line 26, "hexaone" should read --hexanone--.
Column 3, line 51, "Gorup" should read --Group--. Column 3, line 56, "Gorup" should read --Group--. Column 4, line 16, "actitvity" should read --activity--. Column 8, line 12, "$OsCl_4$;" should read --$OsCl_3$;--. Column 8, line 39, "the" should read --The--. Column 8, line 50, Table I, under BET, "237.4" should read --237.7--; "209.7" should read --209.4--.
Column 9, line 22, "Hhydrogen" should read --Hydrogen--.
Column 11, line 17, "in" should read --in- --. Column 12, line 2, "carired" should read --carried--. Column 13, line 12, "4-t.butycyclohexanol" should read --4-t.butylcyclohexanol--.
Column 13, line 18, "nol;" should read --dienol;--.
Column 13, line 35, "in" should read --tin--.

Signed and sealed this 12th day of October 1971.

(SEAL)
Attest:

EDWARD M. FLETCHER, JR.             ROBERT GOTTSCHALK
Attesting Officer                   Acting Commissioner of Patents